(12) United States Patent
White et al.

(10) Patent No.: US 7,714,727 B2
(45) Date of Patent: May 11, 2010

(54) RFID ANTENNA DESIGN THAT CAN SELECTIVELY ENABLE AND DISABLE THE ANTENNA

(75) Inventors: Joseph White, Woodbine, MD (US); Michael Sloan, Ellicott City, MD (US); Eric Heineman, Gaithersburg, MD (US); Hai Tran, Aldie, VA (US); Wayne E. Shanks, Baltimore, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 368 days.

(21) Appl. No.: 11/646,522

(22) Filed: Dec. 28, 2006

(65) Prior Publication Data
US 2008/0157975 A1    Jul. 3, 2008

(51) Int. Cl.
*G08B 13/14* (2006.01)
(52) U.S. Cl. .................... 340/572.7; 340/572.1

(58) Field of Classification Search ............. 340/572.1, 340/572.7, 572.8, 10.1, 539.26
See application file for complete search history.

(56) References Cited

U.S. PATENT DOCUMENTS

| | | | |
|---|---|---|---|
| 5,512,879 A * | 4/1996 | Stokes | 340/573.4 |
| 7,400,247 B2 * | 7/2008 | Hopman et al. | 340/545.2 |
| 2002/0152605 A1 * | 10/2002 | Debraal | 29/600 |
| 2005/0242957 A1 * | 11/2005 | Lindsay et al. | 340/572.7 |

* cited by examiner

*Primary Examiner*—Jeffery Hofsass
(74) *Attorney, Agent, or Firm*—Glenn Frankenberger; Bartholomew J. DiVita; Michael Giannetta

(57) ABSTRACT

Methods and apparatuses for assembling and implementing tamper indicating RFID devices are presented. An RFID device includes a substrate, an electrically conductive pattern formed on the substrate configured to operate as an antenna by separating a portion of a first device section from a second device section, and an electrical circuit mounted on the substrate that is electrically coupled to the antenna. The electrical circuit stores an identification code.

31 Claims, 18 Drawing Sheets

1402

A third RFID interrogation signal to be received by a second conductive pattern of the device is transmitted

A second response from the device is received in response to the third transmitted RFID interrogation signal

A fourth RF signal to be received by the second conductive pattern of the device is transmitted

FIG. 16

RFID ANTENNA DESIGN THAT CAN SELECTIVELY ENABLE AND DISABLE THE ANTENNA

BACKGROUND OF THE INVENTION

1. Field of the Invention

The present invention relates to tamper-indicating radio frequency identification (RFID) devices.

2. Background Art

Radio frequency identification (RFID) tags are electronic devices that may be affixed to items whose presence is to be detected and/or monitored.

The presence of an RFID tag, and therefore the presence of the item to which the tag is affixed, may be checked and monitored by devices known as "readers." Readers typically transmit radio frequency signals to which the tags respond. Each tag can store a unique identification number.

Container seals are often applied to tamper sensitive assets such as medical supplies, military equipment, etc to detect tampering. Typical container seals tear when the asset is tampered with. Thus, tampering can be detected visually as a tear in the seal. The number of assets, however, often becomes so large that visual detection of tampering becomes overly time consuming. Moreover, individual inspection often occurs at discrete times. In between these inspections, the tamper status of the each of the assets is typically unknown.

Thus, what is needed is an efficient and continuous way of tracking the status of a tamper seal.

BRIEF SUMMARY OF THE INVENTION

Methods and apparatuses for assembling and implementing radio frequency identification (RFID) devices are presented. In aspects, an RFID device indicates a tamper status of an item.

In a first aspect of the present invention, an RFID device includes a substrate, an electrically conductive pattern formed on the substrate having an electrically conductive first portion and an electrically conductive second portion, and an electrical circuit mounted on the substrate that is electrically coupled to the electrically conductive pattern. The electrical circuit stores an identification code. The first portion is coupled to the second portion. The first portion and the second portion are configured to be separable along a boundary to enable the first portion to operate as an antenna.

In an example aspect, the electrically conductive pattern includes a first electrical conductor and a second electrical conductor. The first electrical conductor is shorted to the second conductor. Separating the first portion from the second portion opens the short to enable the first portion to operate as an antenna.

In a further aspect, the RFID device includes a second electrically conductive pattern formed on the substrate that is configured to operate as a second antenna and a second electrical circuit. The second electrical circuit is electrically coupled to the second electrically conductive pattern and stores a second identification code.

In an aspect, a method of assembling an RFID device includes forming an electrically conductive pattern on a surface of a substrate having an electrically conductive first portion and an electrically conductive second portion that are coupled together, and mounting an electrical circuit on to the substrate. The electrical circuit is electrically coupled to the antenna. In a further aspect, the method can include separating the first portion from the second portion along a boundary to enable the first portion to operate as an antenna.

In another aspect, a method of tamper-proofing an item includes attaching an RFID device to the item. An electrically conductive pattern of the device is configured to be enabled to operate as an antenna by interacting with the item.

In still another aspect, a method of communicating with an RFID device attached to an item includes transmitting a first RFID interrogation signal to be received by a conductive pattern of the device, interacting with the item, transmitting a second RFID interrogation signal to be received by the conductive pattern, and receiving a response signal to the second transmitted RFID interrogation signal. The item is interacted with such that a first portion of the conductive pattern is separated from a second portion of the conductive pattern to enable the first portion to operate as an antenna.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 14-16 show example steps that may be performed in the flowchart of FIG. 12, according to an embodiment of the present invention.

Figure 1:
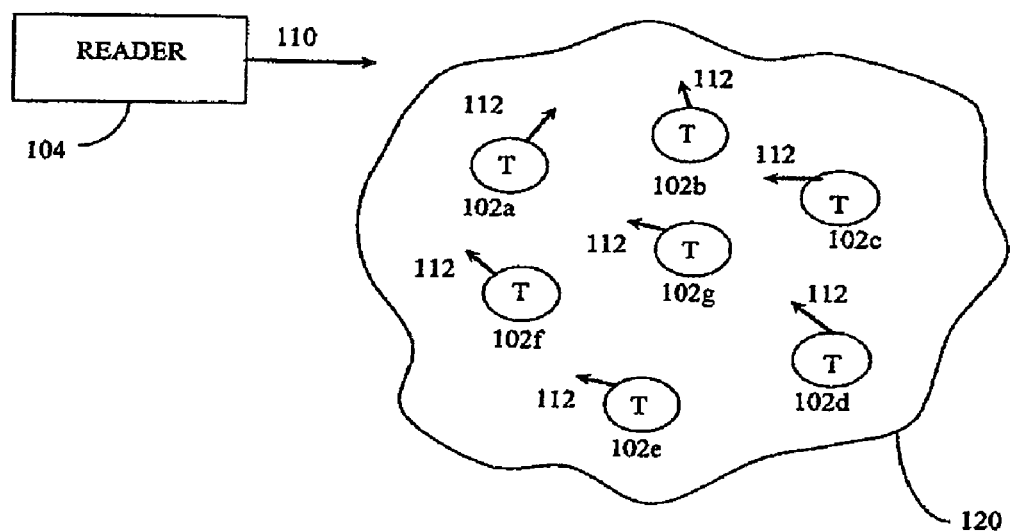
FIG. 1 illustrates an environment where RFID readers communicate with an exemplary population of RFID tags, according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes one or more readers 104. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, reader 104 transmits an interrogation signal 110 having a carrier frequency to the population of tags 120. Reader 104 operates in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, such as an identification number of the responding tag 102. In the embodiments described herein, a reader may be capable of communicating with tags 102 according to any suitable communication protocol, including binary traversal protocols, slotted aloha protocols, Class 0, Class 1, EPC Gen 2, any others mentioned elsewhere herein, and future communication protocols.

Figure 2:
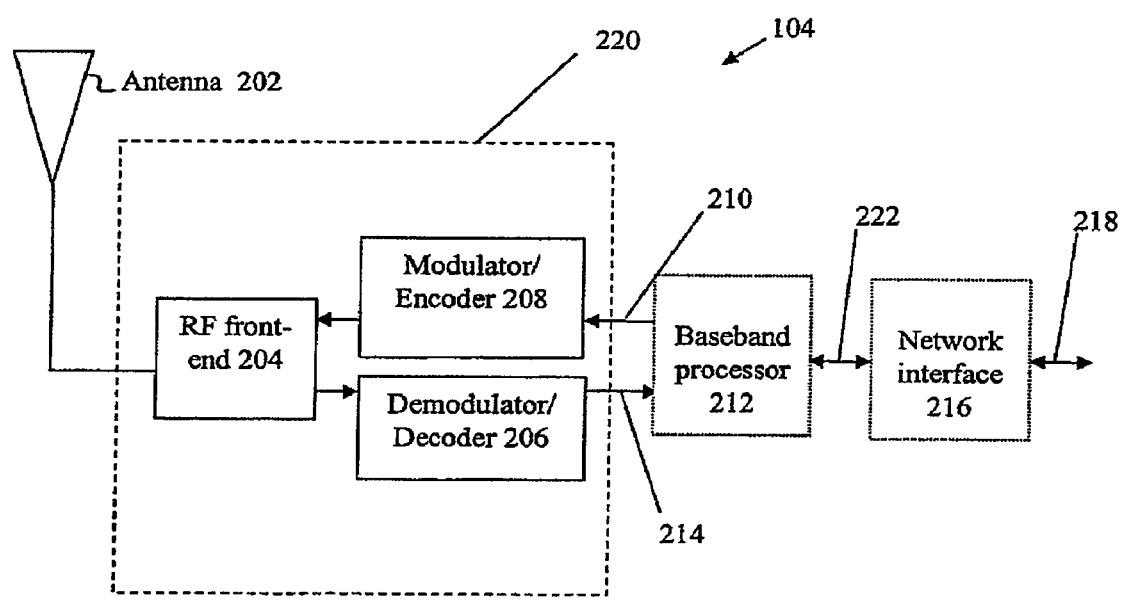
FIG. 2 shows a block diagram of an example RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions. Receiver and transmitter portion 220 may also be referred to as a transceiver.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

Figure 3A:
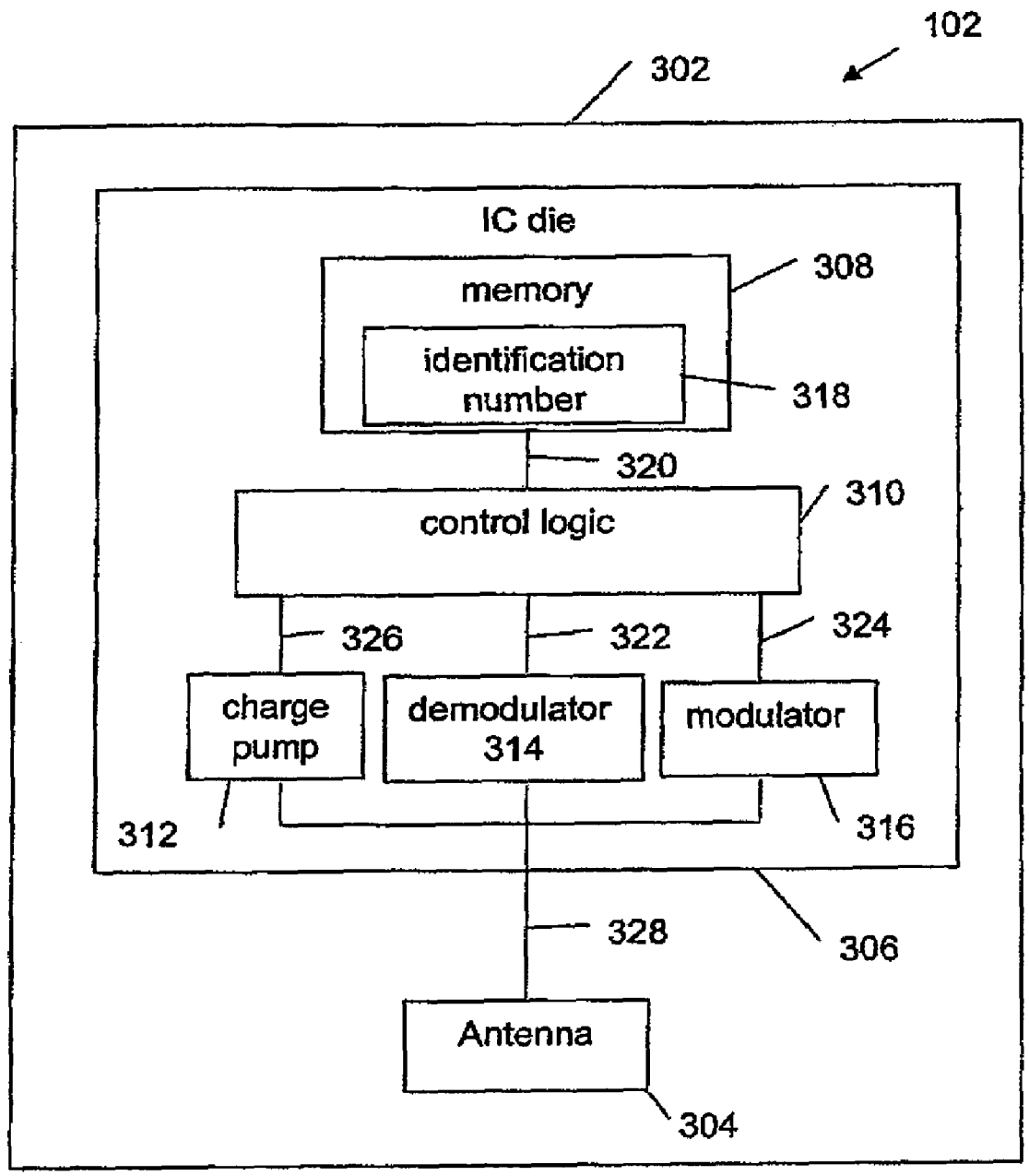
FIG. 3A shows a block diagram of an example RFID tag.

The present invention is applicable to any type of RFID tag. FIG. 3A shows a plan view of an example radio frequency identification (RFID) tag 102. Tag 102 includes a substrate 302, an antenna 304, and an integrated circuit (IC) 306. Antenna 304 is formed on a surface of substrate 302.

Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. Another example form of a "tag" is a tag inlay that has been attached to another surface, or between surfaces, such as paper, cardboard, etc., for attachment to an object to be tracked, such as an article of clothing, etc.

Figure 3B:
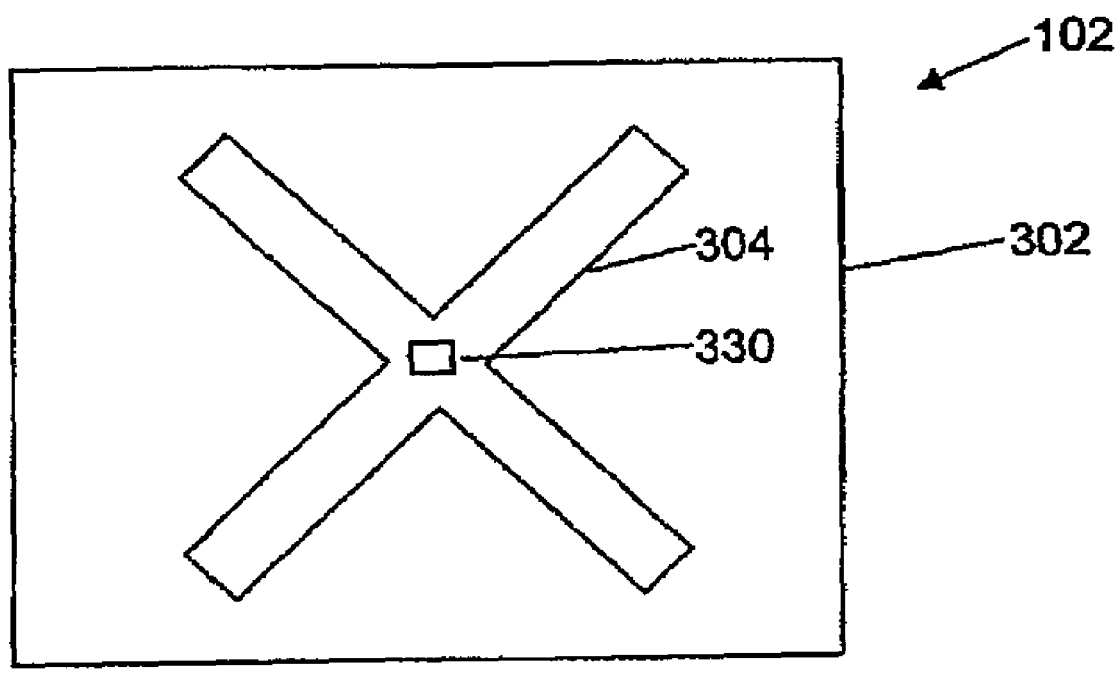
FIG. 3B shows a top view of an example RFID tag.

FIG. 3B shows a top view of an example of tag 102. Tag 102 includes a substrate 302, antenna 304, and an electrical circuit 330. Electrical circuit 330 may include elements one or more elements of IC 306 shown in FIG. 3A. Electrical circuit 330 also may store an identification code that identifies tag 102. Electrical circuit 330 may be commercially available as a single integrated circuit or may have separate components that are assembled with tag 102.

Example embodiments of the present invention are described in further detail below. Such embodiments may be implemented in the environments and readers described above, and/or in alternative environments and alternative RFID devices.

Example RFID Tag Embodiments

Methods, systems, and apparatuses for tamper-indicating RFID devices are presented. In an embodiment, an RFID device includes a substrate, an electrically conductive pattern formed on the substrate, and an electrical circuit electrically coupled to the conductive pattern. The conductive pattern includes an electrically conductive first portion and an electrically conductive second portion. The first portion and the second portion are configured to be separable along a boundary to enable the first portion to operate as an antenna.

The example embodiments described herein are provided for illustrative purposes, and are not limiting. The examples described herein may be adapted to any type of RFID device. Further structural and operational embodiments, including modifications/alterations, will become apparent to persons skilled in the relevant art(s) from the teachings herein.

Figure 4A:
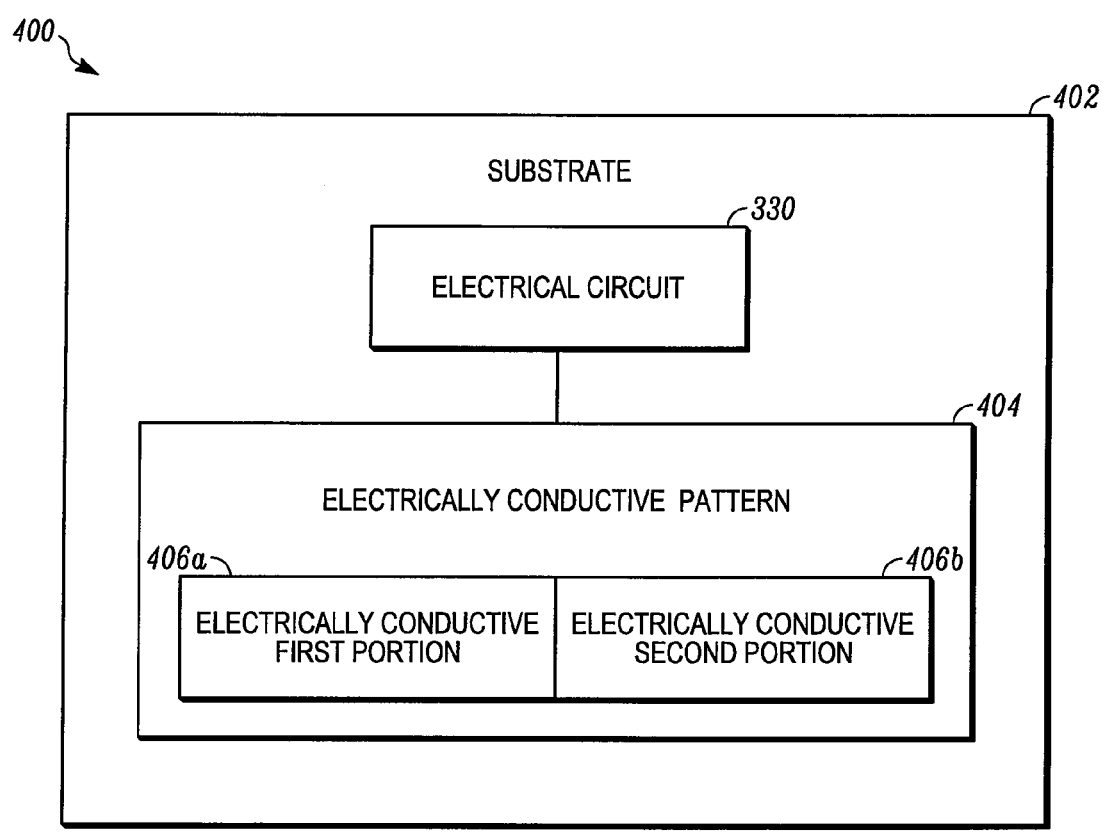
FIG. 4A shows a block diagram of an example RFID device, according to an embodiment of the present invention.

FIG. 4A shows a block diagram of an RFID device 400, according to an embodiment of the present invention. Device 400 includes a substrate 402, electrical circuit 330, and an electrically conductive pattern 404. Substrate 402 may be a variety of different types of substrates such as a flex-tape substrate, as would be understood by someone skilled in the relevant art(s). Electrical circuit 330 stores an identification code. The identification code may identify aspects of device 400 and/or an item to which device 400 is attached. Electrically conductive pattern 404 includes an electrically conductive first portion 406a and an electrically conductive second portion 406b. As shown in FIG. 4A, first portion 406a and second portion 406b are coupled together. As further described below, first portion 406a is configured to operate as an antenna when separated from second portion 406b.

Figure 4B:
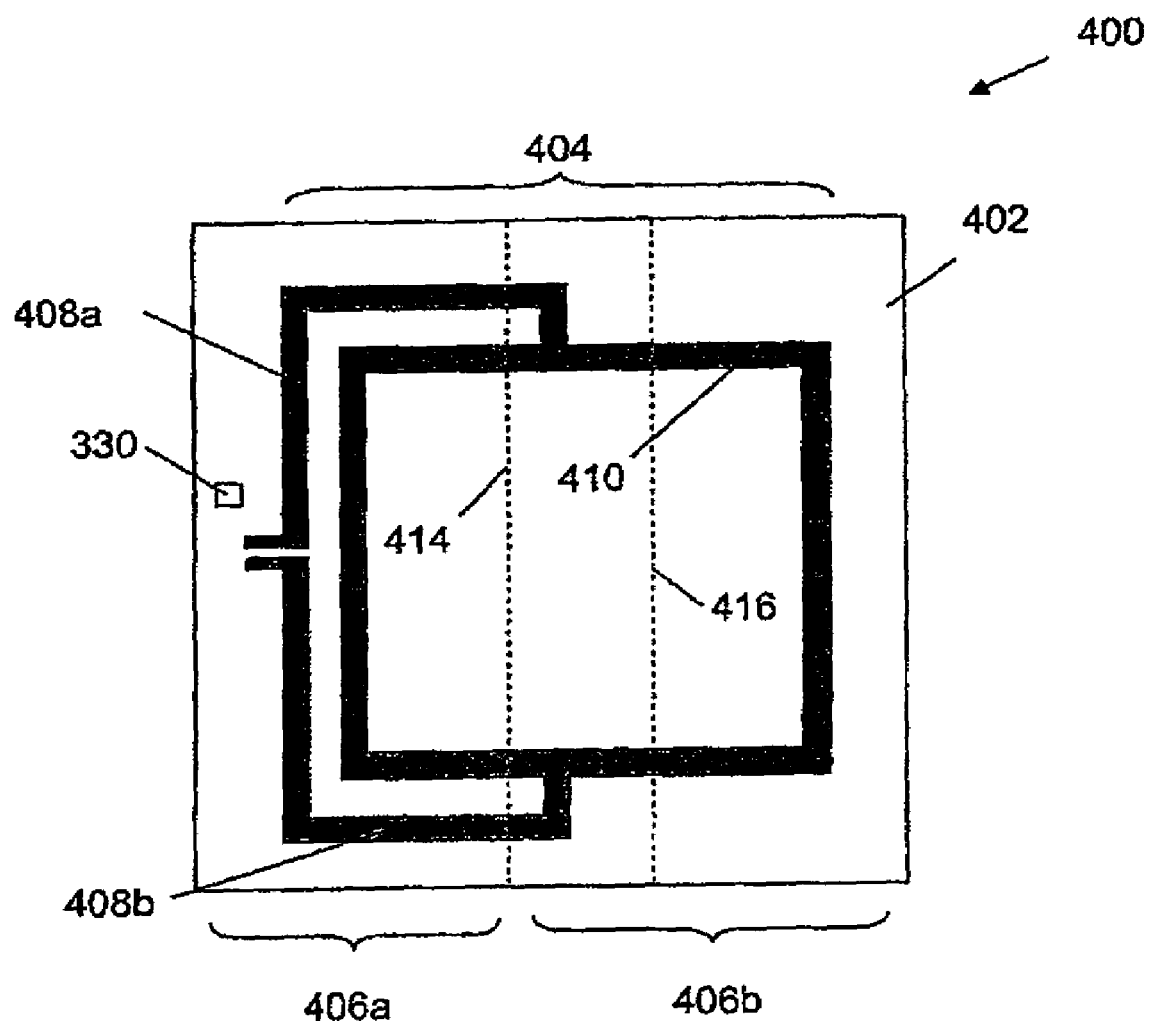
FIGS. 4B and 4C show top views of an example RFID device, according to an embodiment of the present invention.

FIG. 4B shows a top view of RFID device 400, according to an example embodiment of the present invention.

Conductive pattern 404 includes first portion 406a and second portion 406b which meet at a boundary 414. First portion 406a and second portion 406b are made of an electrically conductive material such as copper, aluminum, etc. Electrical circuit 330 may be electrically coupled to conductive pattern 404 through a combination of vias, traces, and/or other connection types. As shown in FIG. 4B, first portion 406a and second portion 406b are combinations of rectangular traces formed on substrate 402. In alternate embodiments, first portion 406a and second portion 406b may have other shapes such as elliptical or irregular.

First portion 406a and second portion 406b are configured to be separable across boundary 414. Separating first portion 406a from second portion 406b enables first portion 406a to operate as an antenna.

For instance, first portion 406a includes a first electrical conductor 408a and a second electrical conductor 408b. In an embodiment, first conductor 408a is shorted to second conductor 408b through a rectangular conductive ring portion 410. First conductor 408a may be shorted to second conductor 408b through a variety of other ways such as a trace or an elliptical ring. In an embodiment, separating first portion 406a from second portion 406b opens the short between first conductor 408a and second conductor 408b (removes ring portion 410) which enables first portion 406a to operate as an antenna.

Conventional electrical components are driven with a signal that has a first and a second part. The total signal delivered to the component is typically the first part of the signal measured relative to the second or vice-a-versa. When all portions of the component are electrically coupled together, no net signal is delivered to the component. Thus, in an embodiment where first conductor 408a is shorted to second conductor 408b, no net signal is delivered to first portion 406a. When the short is opened, a net voltage may develop on first conductor 408a relative to second conductor 408b, which allows first portion 406a to operate as an electrical component, namely an antenna.

Figure 4C:
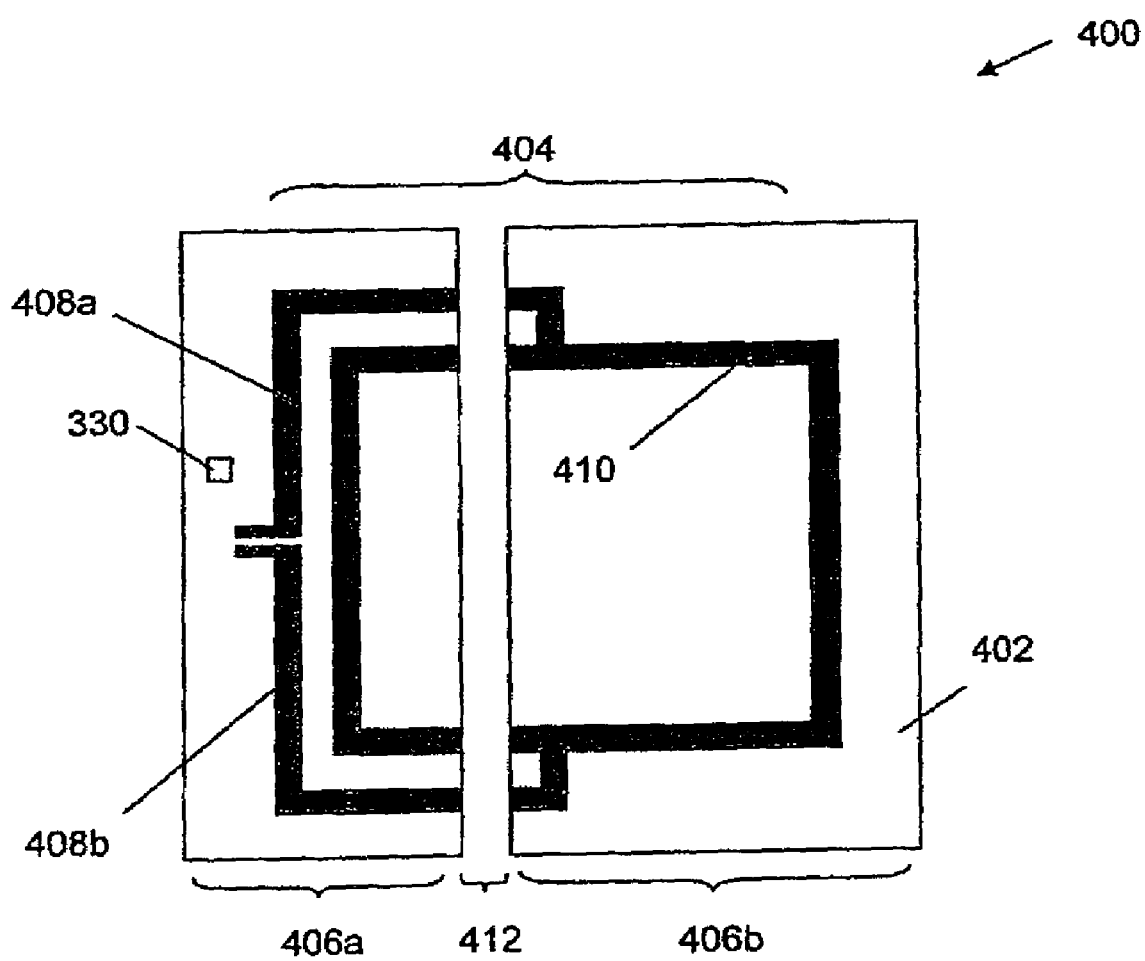

FIG. 4C shows device 400 after device 400 (and conductive pattern 404) has been separated along boundary 414 to separate first portion 406a from second portion 406b. As a result, first conductor 408a is electrically isolated from second conductor 408b which enables first portion 406a to operate as an antenna.

In alternate embodiments, conductive pattern 404 may be divided into first and second portions using other boundaries than boundary 414 shown in FIG. 4B. For example, in FIG. 4B, first portion 406a may also be separated from second portion 406b along boundary 416. Separation along boundary 416 opens the short between first conductor 408a and second conductor 408b to enable first portion 406a to operate as an antenna. Conductive pattern 404 may be divided along any such boundary that opens the short between first conductor 408a and second conductor 408b, as would be understood by persons skilled in the relevant art(s).

As shown FIG. 4C, after separating first portion 406a from second portion 406b, first portion 406a is configured as a dipole antenna. In alternate embodiments, first portion 406a may be configured as another antenna type such as a monopole, dual dipole, or other antenna type.

Furthermore, FIG. 4C also shows first portion 406a completely separated from second portion 406b. However, in alternate embodiments, a section of first portion 406a may be separated from a section of second portion 406b to enable first portion 406a to operate as an antenna.

Thus, in an embodiment, an RFID device may include an RFID tag that becomes able to communicate using an antenna (e.g., first portion 406a) by separating the device. In another embodiment, in addition to this, a second RFID tag of the device may be disabled by separating the device, such as described below with respect to FIGS. 5A-5B.

Figure 5A:
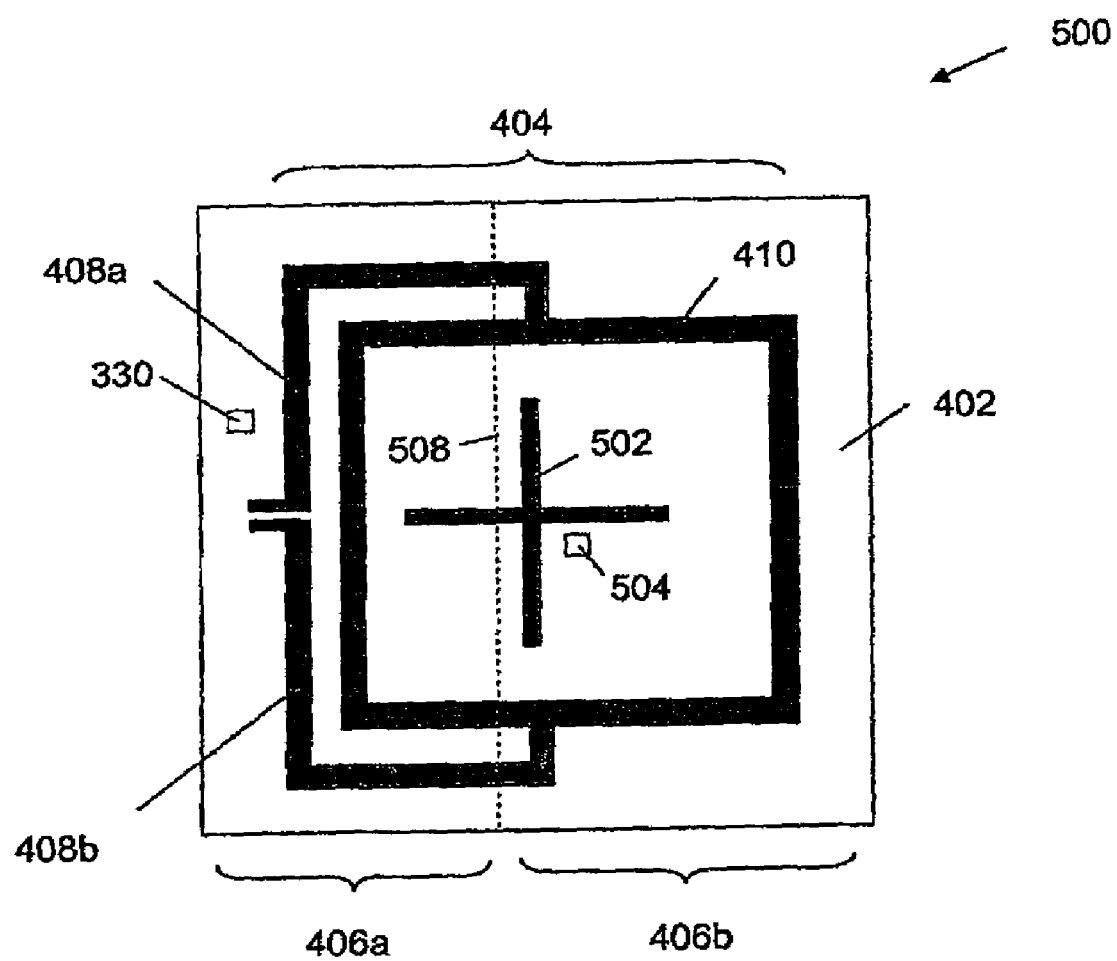
FIGS. 5A-5C show views of another example RFID device, according to an embodiment of the present invention.

FIG. 5A shows another example RFID device 500, according to an embodiment of the present invention. Device 500 includes electrical circuit 330, substrate 402, conductive pattern 404, a second electrically conductive pattern 502, and a second electrical circuit 504. Second electrical circuit 504 may be substantially similar to electrical circuit 330 and is electrically coupled to antenna 502. Second electrical circuit may also store a second identification code that identifies an aspect of device 500 and/or the item to which device 500 is attached.

As shown in FIG. 5A, second conductive pattern 502 is configured to operate as a dual dipole antenna. In alternate embodiments, second conductive pattern 502 may also be configured to operate as a dipole antenna, loop antenna or other antenna type.

A portion of second conductive pattern 502 overlaps boundary 414. When first portion 406a is separated from second portion 406b, second conductive pattern 502 is also separated. In an embodiment, separating second conductive pattern 502 disables second conductive pattern 502 from operating as an antenna.

Figure 5B:
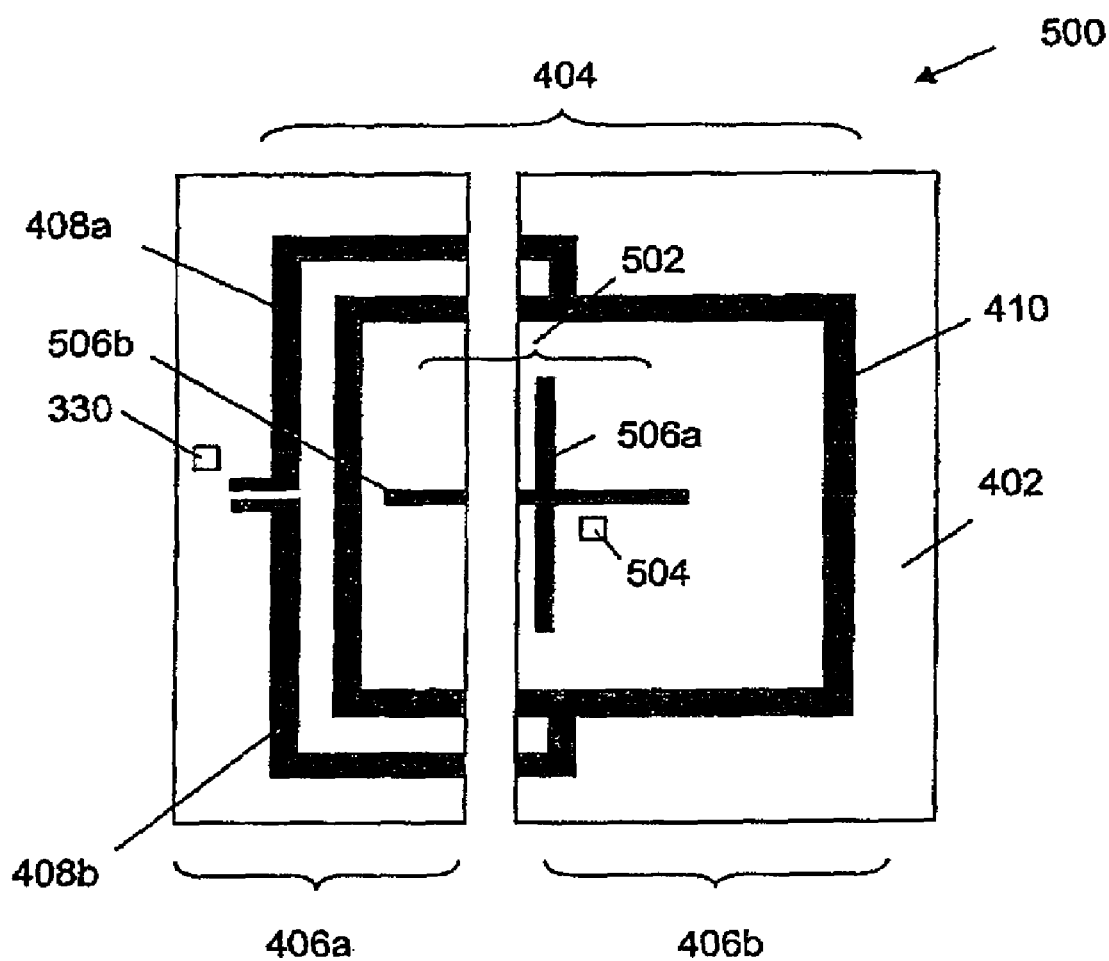

FIG. 5B shows device 500 after device 500 has been separated along a boundary 508. By separating device 500 along 508, first portion 406a has been separated from second portion 406b. Separating first portion 406a from second portion 406b electrically isolates first conductor 408a from second conductor 408b, which enables first portion 406a to operate as antenna. Furthermore, separating first portion 406a from second portion 406b along boundary 414 also disables second conductive pattern 502 from operating as an antenna. As shown in FIG. 5B, second conductive pattern is separated into a first section 506a and a second section 506b.

Thus, a second RFID tag, formed by conductive pattern 502 and electrical circuit 504 is disabled when device 500 is separated, by separating conductive pattern 502. Note that in an embodiment first section 506a of second conductive pattern 502 may remain electrically coupled to second electrical circuit 504, so first section 506a may continue to operate as an antenna after the separation.

Figure 5C:
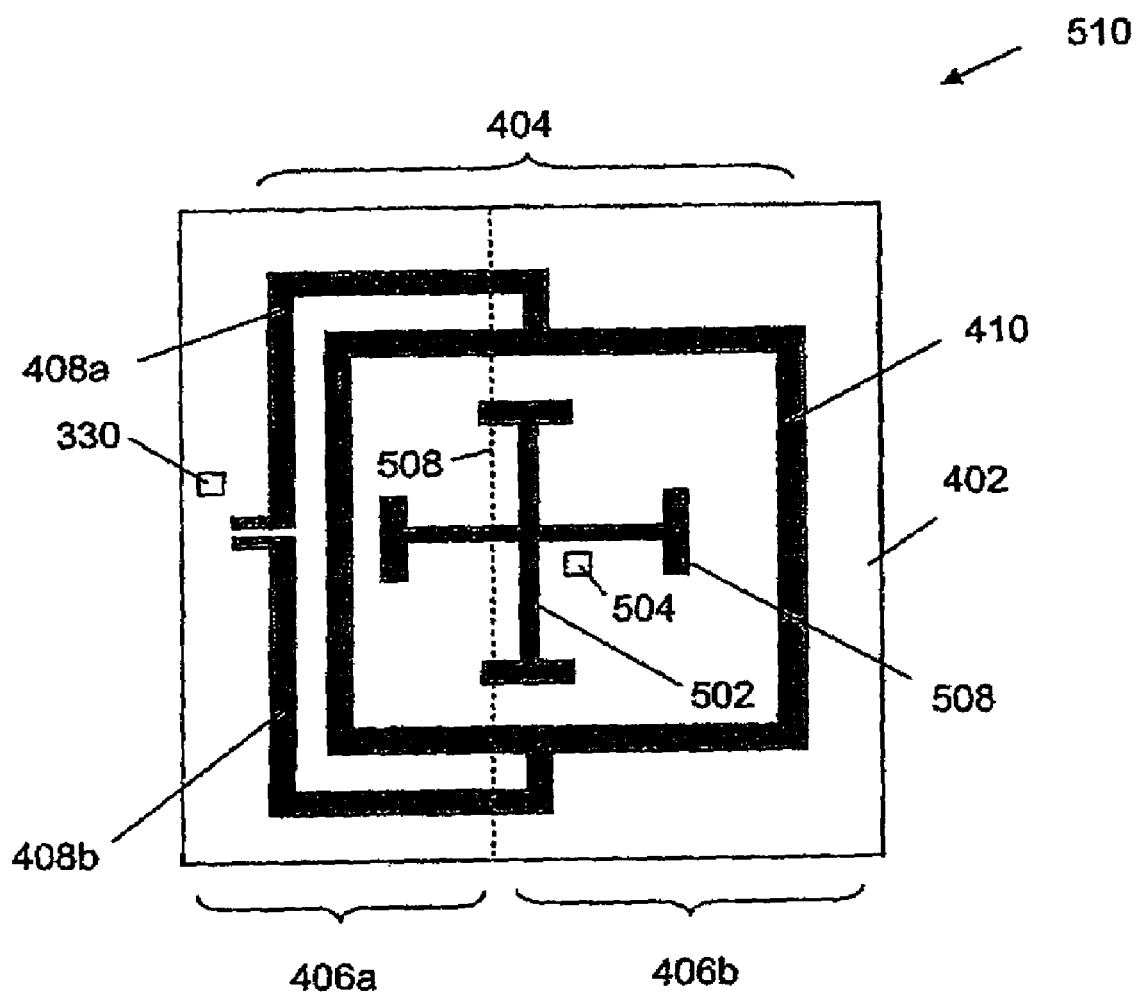

FIG. 5C shows an RFID device 510, according to an embodiment of the present invention. Device 510 is substantially similar to device 500, as shown in FIG. 5A, except that resistive loads 508 are coupled to second conductive pattern 502. Resistive loads 508 may be used to tune characteristics of second conductive pattern 502 while acting as an antenna such as an operating frequency, gain, etc. FIG. 5C shows resistive loads 508 as being substantially rectangular. In alternate embodiments, resistive loads 508 may be curved or have irregular shapes. Moreover, at least a portion of resistive loads 508 is an electrically conductive material such as copper, aluminum, etc.

Figure 6A:
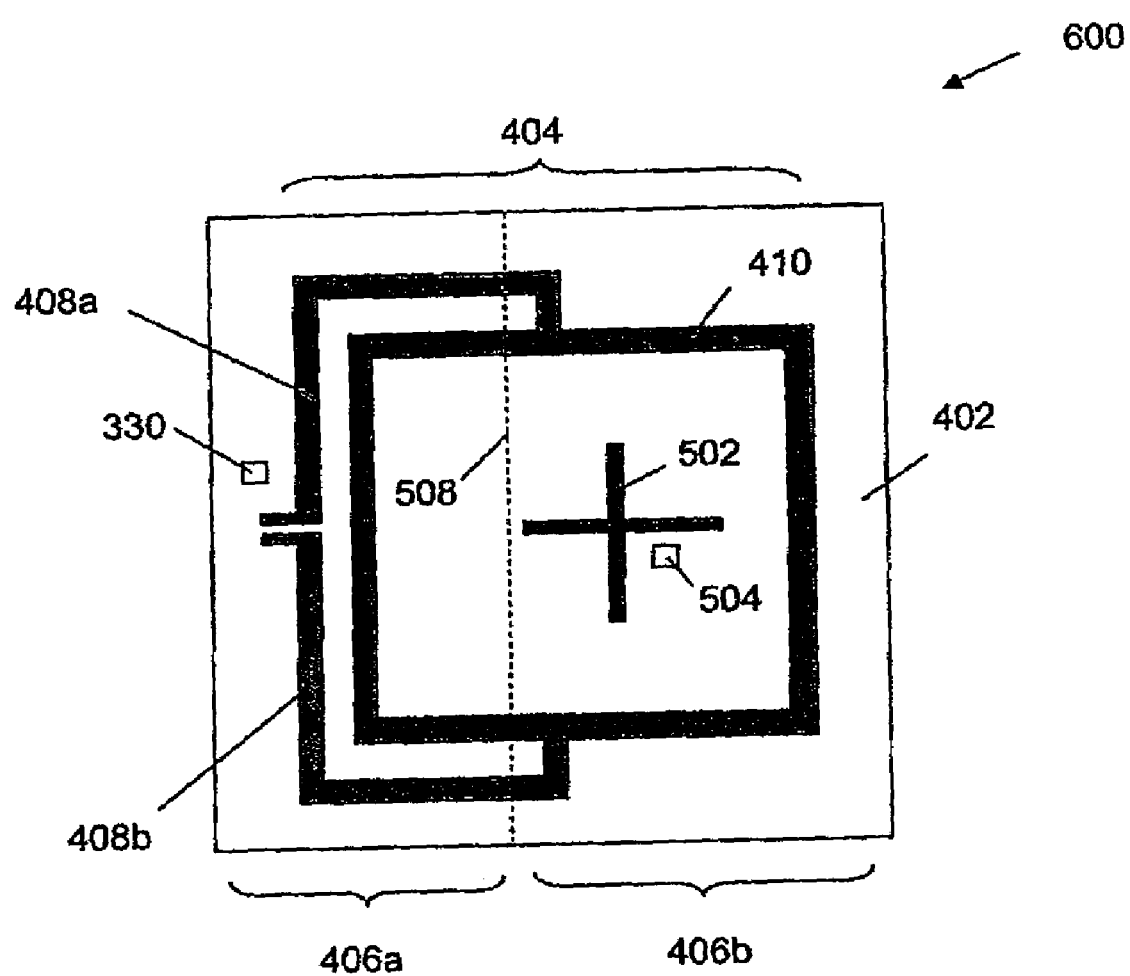
FIGS. 6A and 6B show views of an example RFID device, according to an embodiment of the present invention.

FIG. 6A shows a device 600, according to another embodiment of the present invention. Device 600 is substantially similar to device 500 shown in FIG. 5A except that second conductive pattern 502 is configured to operate as an antenna both when first portion 406a and second portion 406b are joined and when they are separated.

Figure 6B:
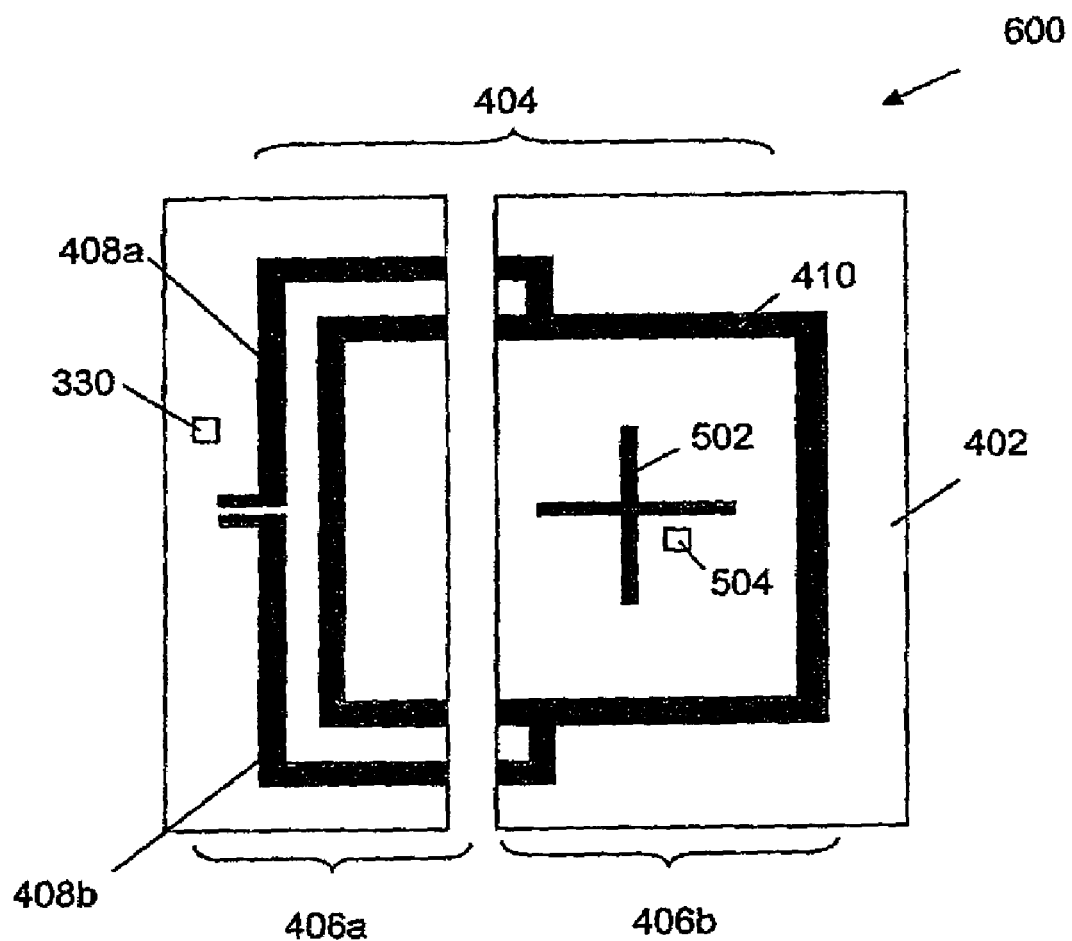

As FIG. 6B shows device 600 after first portion 406a is separated from second portion 406b. Similar to device 500 shown in FIG. 5B, separation electrically isolates first conductor 408a from second conductor 408b which enables first portion 406a to operate as an antenna. After first portion 406a and second portion 406b are separated, second conductive pattern 502 remains intact and coupled to second electrical circuit 504. Thus, second conductive pattern 502 continues to operate as an antenna. Thus, in the embodiment of FIG. 6B, two RFID tags function in device 600 after separation of device 600, including a first RFID tag formed by electrical circuit 330 and first portion 406a, and a second RFID tag formed by conductive pattern 502 and electrical circuit 504.

Figure 7:
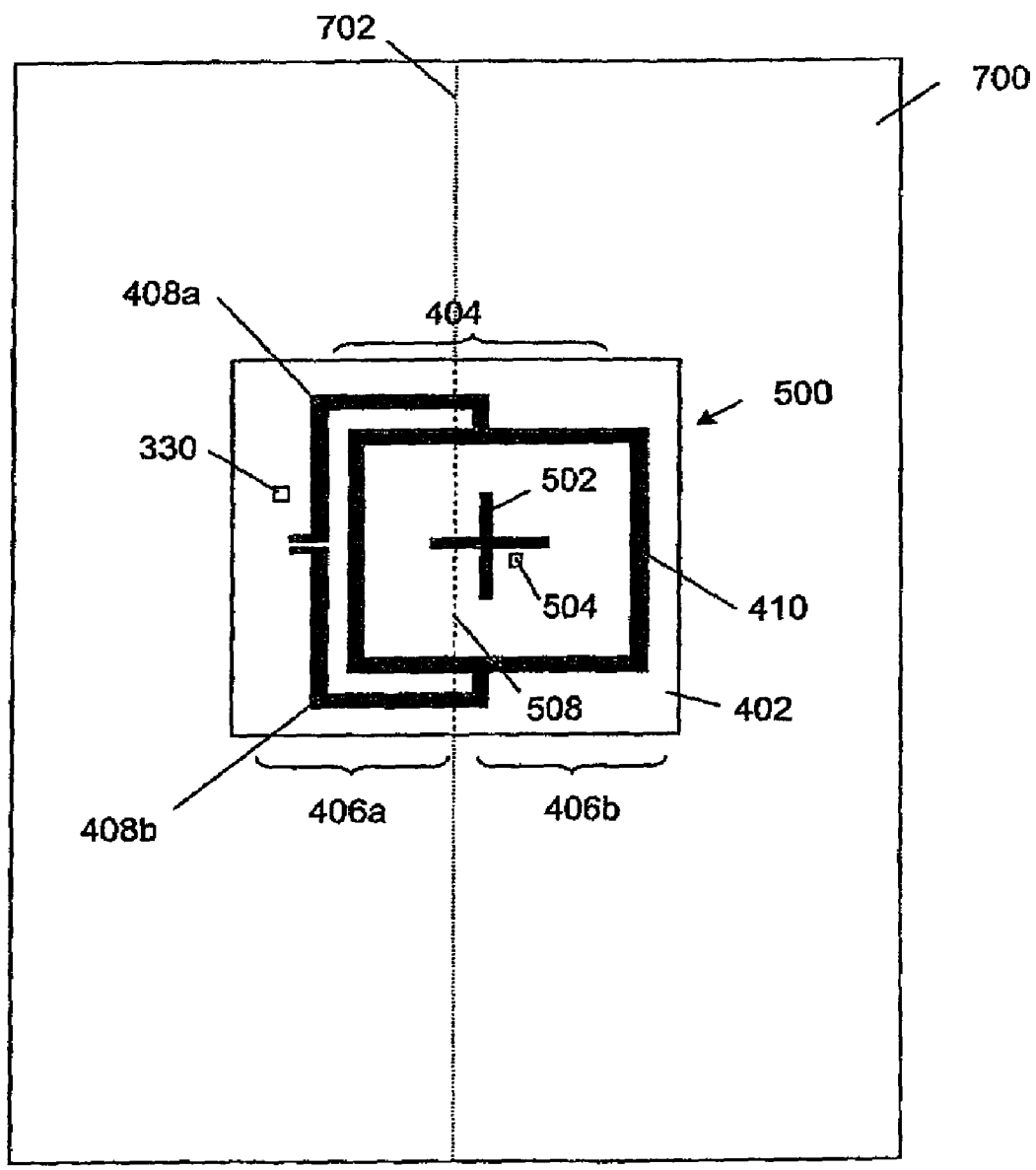
FIG. 7 shows an item with an attached RFID device, according to an embodiment of the present invention.

FIG. 7 shows an item 700 with an attached RFID device 500, according to an embodiment of the present invention. Device 500 is configured to be a seal for item 700. As shown in FIG. 7, seam 702 coincides with boundary 414 that separates first portion 406a and second portion 406b. Interaction with item 700 results in a tear of seam 702 which separates first portion 406a from second portion 406b, enabling first portion 406a to operate as an antenna. First portion 406a may, then, be used to transmit a response to an interrogation signal such that interaction with item 700 is indicated. Interacting with item 700 may include opening, tampering, etc.

Seam 702 may be any type of a seam of an item including a seam between two intersection flaps of a package (e.g., a cardboard box), etc.

The aforementioned embodiments have included RFID devices including conductive patterns configured to operate as antennas by separating the device. In alternate embodiments according to the present invention, RFID devices may also include an electrically conductive pattern, including a first portion and a second portion. The first portion may be an antenna made inoperative by being coupled to the second portion. The antenna is configured to become operative by separating the first portion from the second portion. In such an embodiment, an electrical circuit is also mounted to the substrate and electrically coupled to the antenna.

Figure 8:
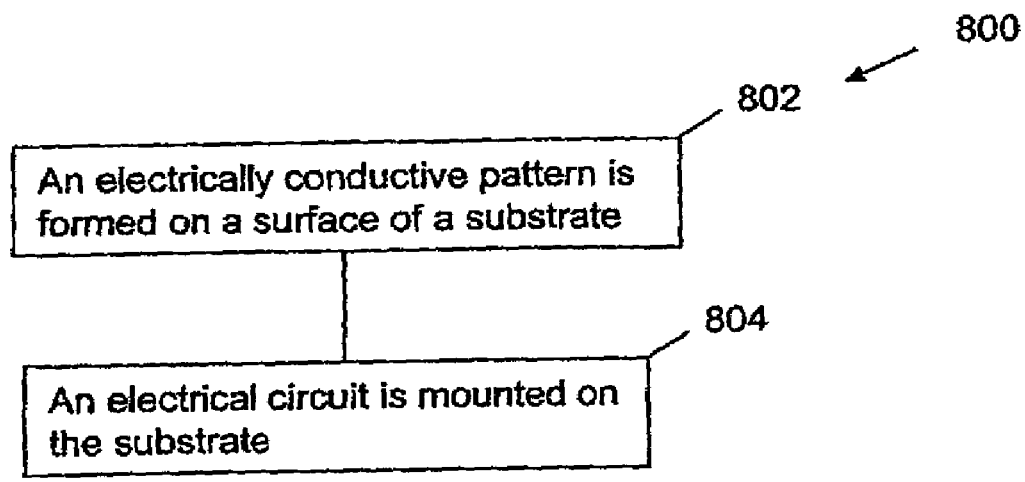
FIG. 8 shows a flowchart providing example steps for the assembly of an RFID device, according to an embodiment of the present invention.

FIG. 8 shows a flowchart 800 providing example steps for assembling an RFID device, according to an embodiment of the present invention. Other structural and operational embodiments will be apparent to persons skilled in the relevant art(s) based on the following discussion. The steps shown in FIG. 8 do not necessarily have to occur in the order shown. The steps of FIG. 8 are described in detail below.

Flowchart 800 begins with step 802. In, step 802 an electrically conductive pattern is formed on a surface of a substrate. The electrically conductive pattern includes an electrically conductive first portion coupled to an electrically conductive second portion. The electrically conductive pattern is formed such that the first portion is capable of operating as an antenna when separated from the second portion. For example, in FIG. 4B, conductive pattern 404 is formed on substrate 402. Conductive pattern 404 includes first portion 406a and second portion 406b divided along boundary 414. First portion 406a is capable of operating as a dipole antenna when separated from second portion 406b. In alternate embodiments, the first portion may be capable of operating as other antenna types such as a dual dipole antenna or a loop antenna.

In an embodiment, the first portion may include a first electrical conductor and a second electrical conductor that are shorted together. The short is configured to be opened when the first portion is separated from the second portion to enable the first portion operate as an antenna. In a further embodiment, an electrically conductive ring shorts the first electrical conductor to the second electrical conductor. For example, in FIG. 4B, first portion 406a includes first electrical conductor 408a and second electrical conductor 408b that are shorted by electrically conductive ring 410.

In step 804, an electrical circuit is mounted on the substrate. The electrical circuit is electrically coupled to the electrically conductive pattern. For example, in FIG. 4B, electrical circuit 330 is mounted on to substrate 402. In an embodiment, the electrical circuit stores an identification code that may identify the device.

Figure 9:
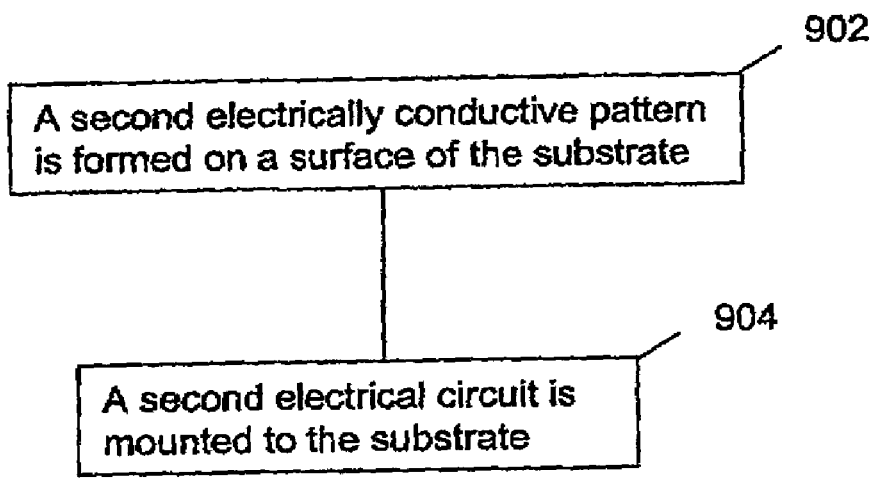
FIGS. 9-10 show example steps that may be performed in the flowchart of FIG. 8, according to an embodiment of the present invention.
Figure 10:
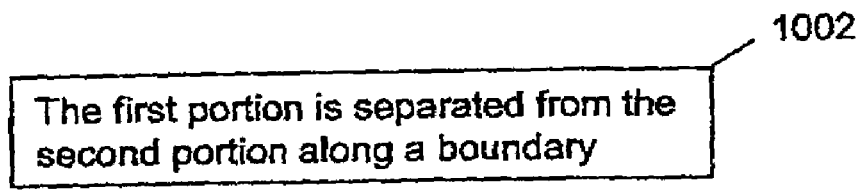

FIGS. 9 and 10 provide optional steps for flowchart 800 shown in FIG. 8. FIG. 9 shows steps 902 and 904. In step 902, a second electrically conductive pattern is formed on a surface of the substrate. The second conductive pattern is configured to operate as a second antenna. For example, in FIG. 5A, second conductive pattern 502 is formed on substrate 402 and configured to operate as a dual dipole antenna. In alternate embodiments, the second conductive pattern may be configured to operate as other antenna types such as a dipole antenna or a loop antenna.

In an embodiment, the second electrically conductive pattern is configured to be disableable from operating as the second antenna by separating the first portion from the second portion. For example, in FIG. 5A, second conductive pattern 502 is configured to be disableable by separating first portion 406a from second portion 406b along boundary 508.

In step 904, a second electrical circuit is mounted to the substrate. The second electrical circuit is electrically coupled to the second conductive pattern. For example in FIG. 5A, second electrical circuit 504 is mounted on substrate 402. In an embodiment, second electrical circuit may store a second identification code that identifies the device and/or the second antenna.

FIG. 10 shows an additional step 1002 for flowchart 800. In step 1002, the first portion is separated from the second portion along a boundary to enable the first portion to operate as an antenna. For example, in FIG. 5B, first portion 406a is separated from second portion 406b to enable first portion 406a to operate as a dipole antenna. The first portion may also be configured to operate as dual dipole, loop, or any other antenna type as would be understood by persons skilled in the relevant art(s). Separating the first portion from the second portion may also disable the second electrically conductive pattern from operating as a second antenna. For example, in FIG. 5B, separating first portion 406a from second portion 406b disables second conductive pattern 502 from operating as a second antenna.

In an embodiment in which the first portion includes a first electrical conductor and a second electrical conductor that are shorted, separating the first portion from the second portion may also include opening the short. In a further embodiment, separating may also include separating the electrically conductive ring that shorts the first electrical conductor to the second electrical conductor. For example, in FIG. 5B, separating first portion 406a from second portion 406b separates electrically conductive ring 410 which opens the short between first electrical conductor 408a and second electrical conductor 408b.

Example Tamper-Proofing Embodiments

Figure 11:
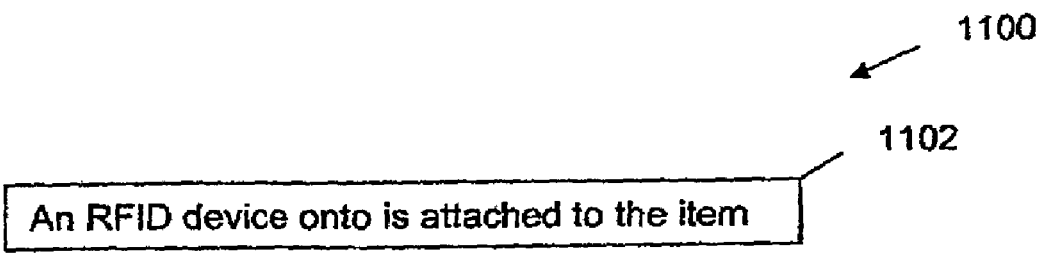
FIG. 11 shows a flowchart providing example steps for the tamper-proofing an item, according to an embodiment of the present invention.

FIG. 11 shows a flowchart 1100 providing an example step for tamper-proofing an item, according to an embodiment of the present invention. Other structural and operational embodiments will be apparent to persons skilled in the relevant art(s) based on the following discussion.

Flowchart 1100 includes step 1102. In step 1002, an RFID device is attached onto an item. The RFID device includes an electrically conductive pattern that is configured to operate as antenna by interacting with the item. In an embodiment, interacting with the item may include opening the item and/or tampering with a tamper seal of the item. Also in an embodiment, the RFID device is configured to be a seal for the item. For example, in FIG. 7 RFID device 500 is attached to item 700. Device 500 includes electrically conductive pattern 404 that is configured to operate as an antenna by interacting with item 700.

The device may be positioned on the item such that interacting with the item separates a first electrically conductive portion from a second electrically conductive portion such that the first portion may operate as an antenna. As shown in FIG. 7, device 500 has a first portion 406a and first portion 406a divided by boundary 414. Device 500 is positioned on item 700 such that boundary 414 coincides with seam 702 that tears (or if cut, such as by a box cutter) when item 700 is interacted with. Thus, device 500 is positioned such that interacting with the item causes first portion 406a and first portion 406a to separate which allows first portion 406a to function as an antenna. In alternate embodiments, the conductive pattern may be configured in other ways such that interacting with the item enables the conductive pattern to operate as an antenna.

Furthermore, the device may also be positioned on the item such that second electrically conductive pattern that is configured to operate as a second antenna becomes disabled from operating as a second antenna by interacting with the item. As shown in FIG. 7, interacting with item 700 separates first portion 406a and second portion 406b disabling second conductive pattern 502 from operating as a second antenna. In an alternate embodiment, the second conductive pattern may also be configured to continue to operate as an antenna after the first portion is separated from the second portion.

Example RFID Device Communication Embodiments

Figure 12:
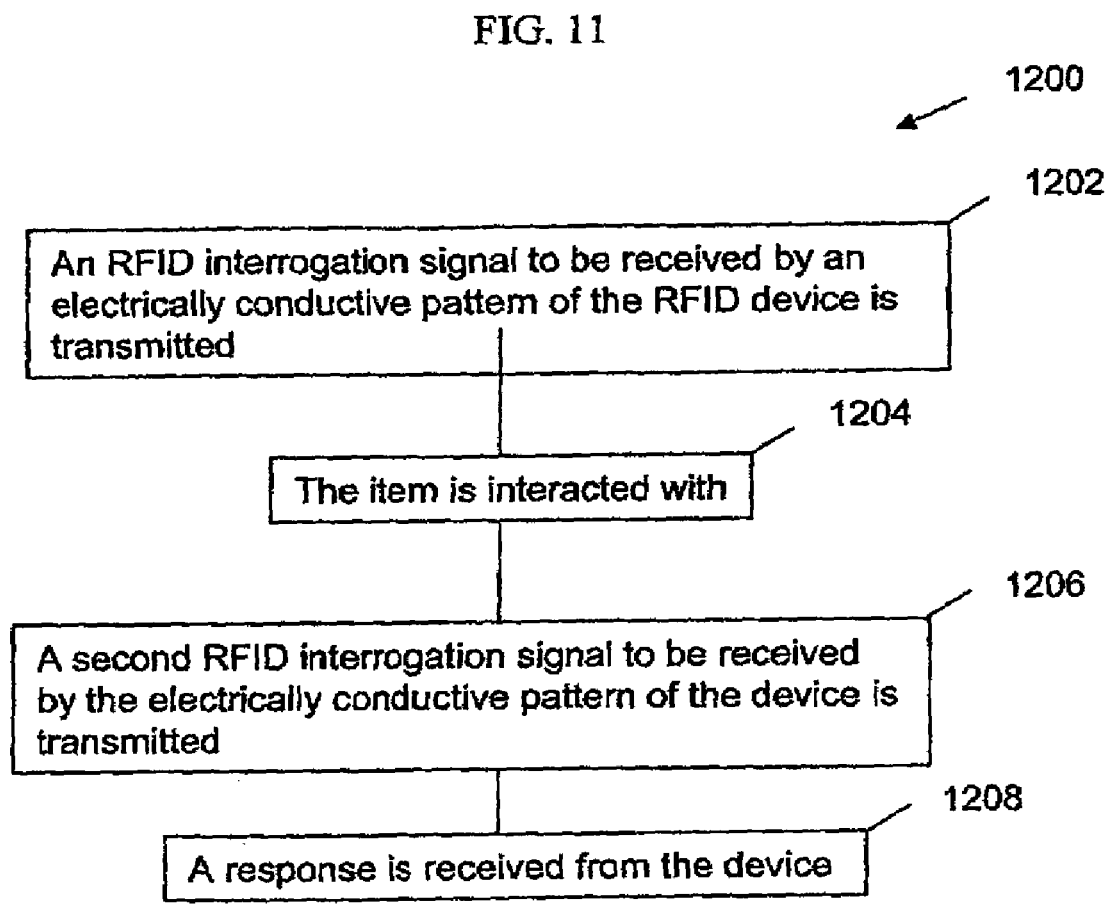
FIG. 12 shows a flowchart providing example steps for communicating with an RFID device, according to an embodiment of the present invention.

FIG. 12 shows a flowchart 1200 providing example steps for communicating with an RFID device attached to an item, according to an embodiment of the present invention. Other structural and operational embodiments will be apparent to persons skilled in the relevant art(s) based on the following discussion. The steps shown in FIG. 12 do not necessarily have to occur in the order shown. The steps of FIG. 12 are described in detail below. FIGS. 13A-13D provide example communication systems for communicating with RFID devices and will be referred to throughout the discussion of flowchart 1200.

FIG. 12 begins in step 1202. In step 1202, an RFID interrogation signal to be received by an electrically conductive pattern of the RFID device is transmitted. The electrically conductive pattern includes an electrically conductive first portion coupled to an electrically conductive second portion. For example, in FIG. 13A, an RFID reader 1302 transmits an RFID interrogation signal 1304.

Figure 13A:
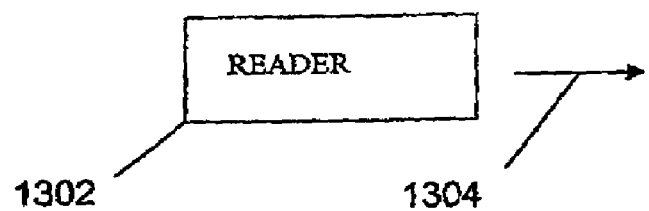
FIGS. 13A-13D illustrate systems for communicating with RFID devices, according to an embodiment of the present invention.
Figure 13B:
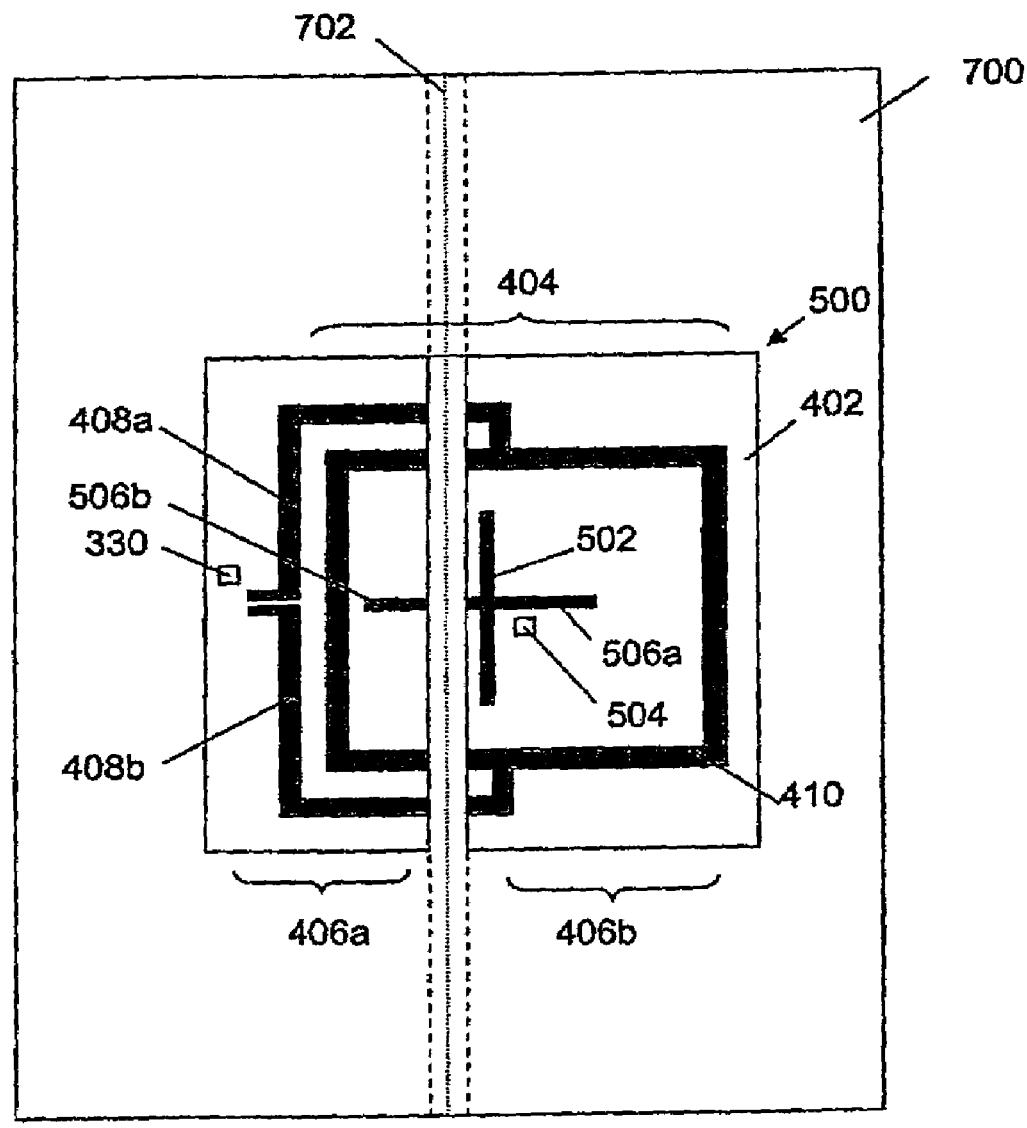
Figure 13C:
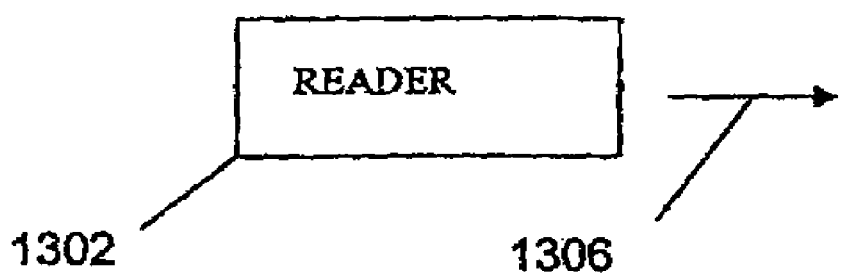
Figure 13D:
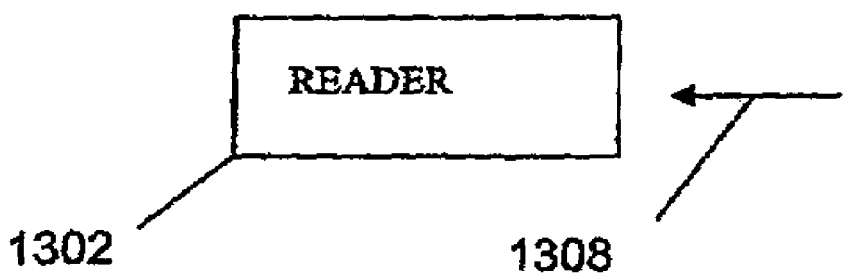

In step 1204, the item is interacted with. The item is interacted with such that the first portion is separated from the second portion to enable the first portion to operate as an antenna. For example, in FIG. 12B, item 700 is interacted with. As shown in FIG. 13B, interacting with item 700 causes a tear along seam 702 of item 700. Seam 702 coincides with boundary 414 of RFID device 500. The tear thus results in first portion 406a being separated from second portion 406b, which electrically isolates first conductor 408a from second conductor 408b allowing first portion 406a to operate as an antenna.

In step 1206, a second RFID interrogation signal to be received by the electrically conductive pattern of the device is transmitted. For example, in FIG. 13C, second RFID interrogation signal 1306 is transmitted.

In step 1208, a response is received from the device. For example, in FIG. 12D, a response signal 1208 is received by reader 1202. In an embodiment, the response signal indicates that the item has been interacted with. The response signal may also include the identification code.

FIGS. 14-16 provide example steps for flowchart 1200 shown in FIG. 12. FIG. 14 shows step 1402. In step 1402, a third RFID interrogation signal to be received by a second electrically conductive pattern of the device is transmitted. The second conductive pattern is configured to operate as an antenna and may also be configured so that interacting with the item disables antenna operation.

FIG. 15 shows step 1502. In step 1502, a second response from the device is received in response to the third transmitted RFID interrogation signal. In an embodiment, the second response signal indicates that the item has not been interacted with. The second response signal may also include a second identification code.

FIG. 16 shows step 1602. In step 1602, a fourth RFID interrogation signal to be received by the second conductive pattern of the device is transmitted. A response to the fourth RFID interrogation signal is not received from the device. In an embodiment, interacting with the item disables the second conductive pattern of the device from operating as a second antenna. In a further embodiment, interacting with the item separates the first portion from the second portion which disables the second conductive pattern from operating as an antenna.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a device may execute computer-readable instructions to transmit RFID interrogation signals, receive responses to RFID interrogation signals, write identification information to tags, and/or perform other functions, as further described elsewhere herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification device comprising:
   a substrate having a first section and a second section;
   an electrically conductive pattern having an electrically conductive first portion disposed on the first section of the substrate and an electrically conductive second portion disposed on the second section of the substrate, wherein the first portion and the second portion of the electrically conductive pattern are coupled together; and
   an electrical circuit on the substrate electrically coupled to the first portion of the electrically conductive pattern, wherein the electrical circuit stores a first identification code;
   wherein the first portion and the second portion are configured to be separable along a boundary to enable the first portion to operate as an antenna when the first section of the substrate is separated from the second section of the substrate.

2. The device of claim 1, wherein the first portion comprises:
   a first electrical conductor; and
   a second electrical conductor, wherein the first electrical conductor is shorted to the second conductor through the second portion, wherein the short is configured to be opened by separating the first portion from the second portion to enable the first portion to operate as an antenna.

3. The device of claim 1, wherein the electrically conductive pattern comprises an electrically conductive ring, wherein the boundary crosses the ring such that the ring is separable to enable the first portion to operate as an antenna.

4. The device of claim 1, wherein the device is configured as a seal for an item.

5. The device of claim 4, wherein the seal is configured such that interaction with the item separates the first portion from the second portion to enable the first portion to operate as an antenna.

6. The device of claim 5, further comprising:
   a second electrically conductive pattern formed on the substrate that is configured to operate as a second antenna; and
   a second electrical circuit on the substrate electrically coupled to the second electrically conductive pattern that stores a second identification code.

7. The device of claim 6, wherein the second electrically conductive pattern is configured to become disabled from operation as the second antenna by separating the first portion from the second portion.

8. The device of claim 6, wherein the first and second electrically conductive patterns comprise at least one of copper or aluminum.

9. The device of claim 6, wherein the second electrically conductive pattern is configured to operate as a dipole antenna, dual dipole antenna, or loop antenna.

10. The device of claim 6, further comprising at least one resistive load coupled to the second electrically conductive pattern.

11. The device of claim 1, wherein the first portion is configured to operate as a dipole antenna, dual dipole antenna, or loop antenna when separated from the second portion.

12. A radio frequency identification (RFID) device comprising:
a substrate having a first section and a second section;
an electrically conductive pattern having a first portion disposed on the first section of the substrate and a second portion disposed on the second section of the substrate of the substrate, wherein the first portion of the electrically conductive pattern is an antenna made inoperative by being coupled to the second portion, wherein the antenna is configured to become operative by separating the second section from the first section of the substrate; and
an electrical circuit electrically coupled to the antenna.

13. A method for assembling an RFID device comprising:
forming an electrically conductive first portion of an electrically conductive pattern on a first section of a substrate and an electrically conductive second portion of the electrically conductive pattern on a second section of a substrate, wherein the first portion of the electrically conductive pattern is an antenna made inoperative by being coupled to the second portion; and
mounting an electrical circuit on to the substrate, wherein the electrical circuit is electrically coupled to the antenna;
wherein said forming step comprises:
forming the first portion to be capable of operating as an antenna when the first section of the substrate is separated from the second section.

14. The method of claim 13, further comprising:
separating the first portion from the second portion along a boundary to enable the first portion to operate as an antenna.

15. The method of claim 13, wherein the first portion comprises a first electrical conductor and a second electrical conductor that are shorted wherein the separating step comprises:
opening the short to enable the first portion to operate as an antenna.

16. The method of claim 13, wherein the electrically conductive pattern further comprises an electrically conductive ring, wherein the separating step comprises:
separating the ring to enable the first portion to operate as an antenna.

17. The method of claim 13, further comprising:
forming a second electrically conductive pattern on the substrate configured to operate as a second antenna; and
mounting a second electrical circuit to the substrate, wherein the second electrical circuit is coupled to the second electrically conductive pattern, wherein the second electrical circuit stores a second identification code.

18. The method of claim 17, wherein the step of forming the second electrically conductive pattern further comprises:
forming the second electrically conductive pattern on a surface of the substrate to be disabled from operating as the second antenna by separating the first portion from the second portion.

19. The method of claim 13, wherein the device is configured as a seal, further comprising:
configuring the device on an item such that interaction with the item separates the first portion from the second portion.

20. A method for tamper-proofing an item, comprising:
attaching an RFID device onto the item, wherein an electrically conductive pattern on a substrate of the device is configured to operate as an antenna by interacting with the item
wherein the attaching further comprises:
positioning the device such that interacting with the item separates a first section of the substrate having an electrically conductive first portion of the electrically conductive pattern from a second section of the substrate having an electrically conductive second portion of the electrically conductive pattern to enable the electrically conductive first portion to operate as an antenna.

21. The method of claim 20, wherein positioning further comprises:
positioning the device on a seam of the item such that separating the seam separates the first portion from the second portion to enable the first portion to operate as an antenna.

22. The method of claim 20, wherein interacting with the item comprises opening the item.

23. The method of claim 20, wherein the positioning step further comprises:
positioning the device such that interacting with the device separates the first portion from the second portion whereby a second electrically conductive pattern of the device is disabled from operating as a second antenna.

24. The method of claim 20, wherein the device is configured as a seal for the item.

25. A method for communicating with a radio frequency identification (RFID) device attached to an item, comprising:
transmitting an RFID interrogation signal to be received by an electrically conductive pattern of the RFID device, wherein the electrically conductive pattern comprises an electrically conductive first portion disposed on a first section of a substrate of the RFID device and an electrically conductive second portion disposed on a second section of the substrate of the RFID device;
interacting with the item such that the first section of the substrate is separated from the second section to enable the electrically conductive first portion to operate as an antenna;
transmitting a second RFID interrogation signal to be received by the electrically conductive pattern of the RFID device; and
receiving a response to the second RFID interrogation signal from the RFID device.

26. The method of claim 25, further comprising:
transmitting a third RFID interrogation signal to be received by a second electrically conductive pattern of the device, wherein the second electrically conductive pattern is configured to operate as an antenna.

27. The method of claim 26, further comprising:
receiving a response signal in response to the third transmitted RFID interrogation signal.

28. The method of claim 27, wherein the response to the third transmitted RFID interrogation signal indicates that the item has not been interacted with.

29. The method of claim 27, wherein separating the first portion from the second portion disables the second electrically conductive portion from operating as an antenna, further comprising:
transmitting a fourth RFID interrogation signal to be received by the second electrically conductive pattern, wherein a response signal to the fourth transmitted RFID interrogation signal is not received.

30. The method of claim 25, wherein the response to the second transmitted RF signal provides an identification code that identifies the device.

31. The method of claim 26, wherein the response to the third transmitted RFID interrogation signal provides a second identification code that identifies the device.

* * * * *

UNITED STATES PATENT AND TRADEMARK OFFICE
CERTIFICATE OF CORRECTION

PATENT NO. : 7,714,727 B2  
APPLICATION NO. : 11/646522  
DATED : May 11, 2010  
INVENTOR(S) : White et al.

Page 1 of 1

It is certified that error appears in the above-identified patent and that said Letters Patent is hereby corrected as shown below:

IN THE DRAWINGS:  
In Fig. 12, Sheet 15 of 18, for Tag "1202", Line 2, delete "pattem" and insert -- pattern --, therefor.

IN THE SPECIFICATION:  
In Column 5, Line 50, delete "FMO" and insert -- FM0 --, therefor.

In Column 5, Lines 61-67, delete "Antenna 304 may................. non-recessed location." and insert the same at Line 60, after "of substrate 302", as a continuation of the paragraph.

In Column 9, Line 65, delete "FIG. SC" and insert -- FIG. 5C --, therefor.

In Column 10, Line 6, delete "FIG. SA" and insert -- FIG. 5A --, therefor.

In Column 15, Lines 13-14, in Claim 12, delete "of the substrate of the substrate," and insert -- of the substrate, --, therefor.

Signed and Sealed this  
Fifteenth Day of November, 2011

David J. Kappos  
*Director of the United States Patent and Trademark Office*